US011562605B2

(12) United States Patent
Sethi

(10) Patent No.: US 11,562,605 B2
(45) Date of Patent: Jan. 24, 2023

(54) TIRE SIDEWALL TEMPERATURE SENSING SYSTEMS AND METHODS

(71) Applicant: TDK CORPORATION, Tokyo (JP)

(72) Inventor: Rakesh Sethi, Saratoga, CA (US)

(73) Assignee: TDK CORPORATION, Tokyo (JP)

( * ) Notice: Subject to any disclaimer, the term of this patent is extended or adjusted under 35 U.S.C. 154(b) by 23 days.

(21) Appl. No.: 16/681,662

(22) Filed: Nov. 12, 2019

(65) Prior Publication Data
US 2021/0142598 A1     May 13, 2021

(51) Int. Cl.
  *B60C 23/20* (2006.01)
  *G07C 5/08* (2006.01)
  *G01K 11/00* (2006.01)
  *G01K 13/00* (2021.01)
  *G01C 5/06* (2006.01)

(52) U.S. Cl.
  CPC ............ *G07C 5/0841* (2013.01); *B60C 23/20* (2013.01); *G01K 11/00* (2013.01); *G01K 13/00* (2013.01); *G07C 5/0816* (2013.01); *G01C 5/06* (2013.01)

(58) Field of Classification Search
  CPC .... B60C 23/20; G07C 5/0816; G07C 5/0841; G01K 11/00; G01K 13/00
  See application file for complete search history.

(56) References Cited

U.S. PATENT DOCUMENTS

| 9,434,409 | B2 * | 9/2016 | Singh ...................... B60C 19/00 |
| 2004/0064219 | A1 | 4/2004 | Mancosu | |
| 2005/0069667 | A1 * | 3/2005 | Wacker ............... B60C 23/0408 428/40.1 |
| 2005/0274176 | A1 | 12/2005 | Thiesen | |
| 2006/0260390 | A1 | 11/2006 | Oflaz | |
| 2011/0142598 | A1 | 6/2011 | Andersen | |
| 2011/0203710 | A1 * | 8/2011 | Hinojosa, Jr. .......... B60C 23/04 152/419 |

(Continued)

FOREIGN PATENT DOCUMENTS

| CN | 104965130 A | 10/2015 |
| CN | 103660811 B | 3/2016 |

(Continued)

OTHER PUBLICATIONS

Adaptive threshold for outlier detection on data streams by Clark et al., Proceedings—2018 IEEE 5th International Conference on Data Science and Advanced Analytics, DSAA 2018 : 41-49. Institute of Electrical and Electronics Engineers Inc. (Jan. 31, 2019) (Year: 2019).*

(Continued)

*Primary Examiner* — Sze-Hon Kong
*Assistant Examiner* — Chanmin Park
(74) *Attorney, Agent, or Firm* — Duane Morris LLP

(57) ABSTRACT

Systems and methods for sensing a tire parameter from a rotating wheel are disclosed. In some embodiments, a system includes: a rotatable component configured to rotate; a piezoelectric transducer disposed along a circumference of the rotatable component, where the piezoelectric transducer is configured to generate an offload voltage based on a mechanical deformation of the piezoelectric transducer; and at least one processor in communication with the piezoelectric transducer, the at least one processor configured to determine a temperature value based on the offload voltage.

18 Claims, 10 Drawing Sheets

(56) References Cited

U.S. PATENT DOCUMENTS

| | | | |
|---|---|---|---|
| 2012/0139717 A1* | 6/2012 | Cao | B60C 23/20 340/449 |
| 2016/0016445 A1* | 1/2016 | Peine | B60C 23/0486 73/146.5 |
| 2017/0234745 A1 | 8/2017 | Choi | |
| 2017/0334290 A1* | 11/2017 | Homsangpradit | B60W 30/02 |
| 2018/0149525 A1 | 5/2018 | Yoon | |

FOREIGN PATENT DOCUMENTS

| | | |
|---|---|---|
| DE | 10253367 A1 | 6/2004 |
| DE | 102007041920 A1 | 3/2009 |
| EP | 2746061 A1 | 6/2014 |
| EP | 2705963 B1 | 3/2019 |
| JP | S60-151526 A | 8/1985 |
| JP | 2003526560 A | 9/2003 |
| JP | 2004082853 A | 3/2004 |
| JP | 2006025593 A | 1/2006 |
| WO | 2008068599 A2 | 6/2008 |

OTHER PUBLICATIONS

Wilburn, David K. "A temperature study of pneumatic tires during highway operation." No. TACOM-TR-11716. Army Tank-Automotive Command Warren MI, Dec. 1972, 56 pages.

Yang, Hailu, et al. "Investigation on the factors influencing the performance of piezoelectric energy harvester." Road Materials and Pavement Design 18.sup3 (2017): 180-189.

* cited by examiner

TIRE SIDEWALL TEMPERATURE SENSING SYSTEMS AND METHODS

TECHNICAL FIELD

This application relates generally to sensor systems and, more particularly, relates to systems and methods for sensing a tire sidewall temperature from a rotating wheel.

BACKGROUND

Traditional vehicular-based sensor systems are unable to determine the temperature at a rotating wheel. An example of a traditional vehicular-based sensor system is an inertial navigation system (INS). The INS may be utilized to determine a position, orientation, and velocity of a moving object. An INS may include, for example, accelerometers and rotation sensors to continuously calculate the position, orientation, and velocity of a moving object by dead reckoning without the need for external references. An INS is typically centrally disposed on a static part of a chassis of a vehicle, and not on a moving part such as a wheel, so as to provide more accurate readings. However, the data gathered by an INS may be limited to only that sensed from the static part of the chassis of the vehicle. Therefore, there may be a need for improved sensor systems that are not as limited.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In some embodiments, a system includes: a rotatable component configured to rotate; a piezoelectric transducer disposed along a circumference of the rotatable component, where the piezoelectric transducer is configured to generate an offload voltage based on a mechanical deformation of the piezoelectric transducer; and at least one processor in communication with the piezoelectric transducer, the at least one processor configured to determine a temperature value based on the offload voltage.

In some embodiments, the temperature value is associated with a flexible sidewall that contacts the piezoelectric transducer.

In some embodiments, the rotatable component is part of a wheel and the piezoelectric transducer directly contacts a flexible sidewall of the wheel.

In some embodiments, the at least one processor is disposed within a vehicle body to which the rotatable component is mounted.

In some embodiments, a voltage sensor is in communication with the piezoelectric transducer. The voltage sensor may be configured to determine an offload voltage value of the offload voltage, where the at least one processor is configured to determine the temperature value based on the offload voltage value.

In some embodiments, the rotatable component includes a rim, where the rim includes an outer facing surface opposite an inner facing surface in which the circumference of the rotatable component is bound, where the voltage sensor is located within a central housing along the inner facing surface.

In some embodiments, the piezoelectric transducer is located along the outer facing surface and is connected with the voltage sensor via a conductive line.

In some embodiments, a tire is coupled to the rotatable component, where the tire when inflated is configured to transfer force to the rotatable component resulting from compressive force acting on a portion of the tire making contact with a road, where the piezoelectric transducer is configured to mechanically deform in response to the compressive force acting on the portion of the tire making contact with the road as the rotatable component rotates.

In some embodiments, a method includes: determining a starting temperature; rotating a rotatable component at the starting temperature; determining a starting voltage value from a piezoelectric transducer disposed along a circumference of the rotatable component, where the piezoelectric transducer is configured to generate voltage based on a mechanical deformation of the piezoelectric transducer; determining an operational voltage value from the piezoelectric transducer after determination of the starting voltage value; and determining an operational temperature based on the operational voltage value.

In some embodiments, the method further includes performing an action based on aggregated sensor data, where the aggregated sensor data includes the operational temperature.

In some embodiments, the method further includes determining a probability of tire rupture based on the operational temperature.

In some embodiments, the method further includes producing an alert in response to the probability of tire rupture exceeding a threshold value.

In some embodiments, the method further includes determining an outlier value as the threshold value using a statistical model applied to sensor data that includes the operational temperature.

In some embodiments, the piezoelectric transducer includes a piezoelectric material.

In some embodiments, the rotatable component is mounted to a vehicle body.

Some embodiments include a non-transitory computer readable medium having instructions stored thereon, where the instructions, when executed by a processor, cause a device to perform operations including: receiving a starting temperature associated with a rotatable component; receiving a starting voltage value from a piezoelectric transducer disposed along a circumference of the rotatable component, where the piezoelectric transducer is configured to generate voltage based on a mechanical deformation of the piezoelectric transducer; receiving an operational voltage value from the piezoelectric transducer after collection of the starting voltage value; and determining an operational temperature based on the operational voltage value, the starting voltage value, and the starting temperature.

In some embodiments, the operations further include: determining the operational temperature based on scaling the starting temperature based on the operational voltage value and the starting voltage value.

In some embodiments, the operations further include: determining a historical operational temperature set based on the operational temperature collected over a period of time; and determining a probability of tire rupture based on the historical operational temperature set.

In some embodiments, the piezoelectric transducer is configured to send the operational voltage value to the processor via a wireless connection.

In some embodiments, the wireless connection bypasses a vehicle bus.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Figure 1:
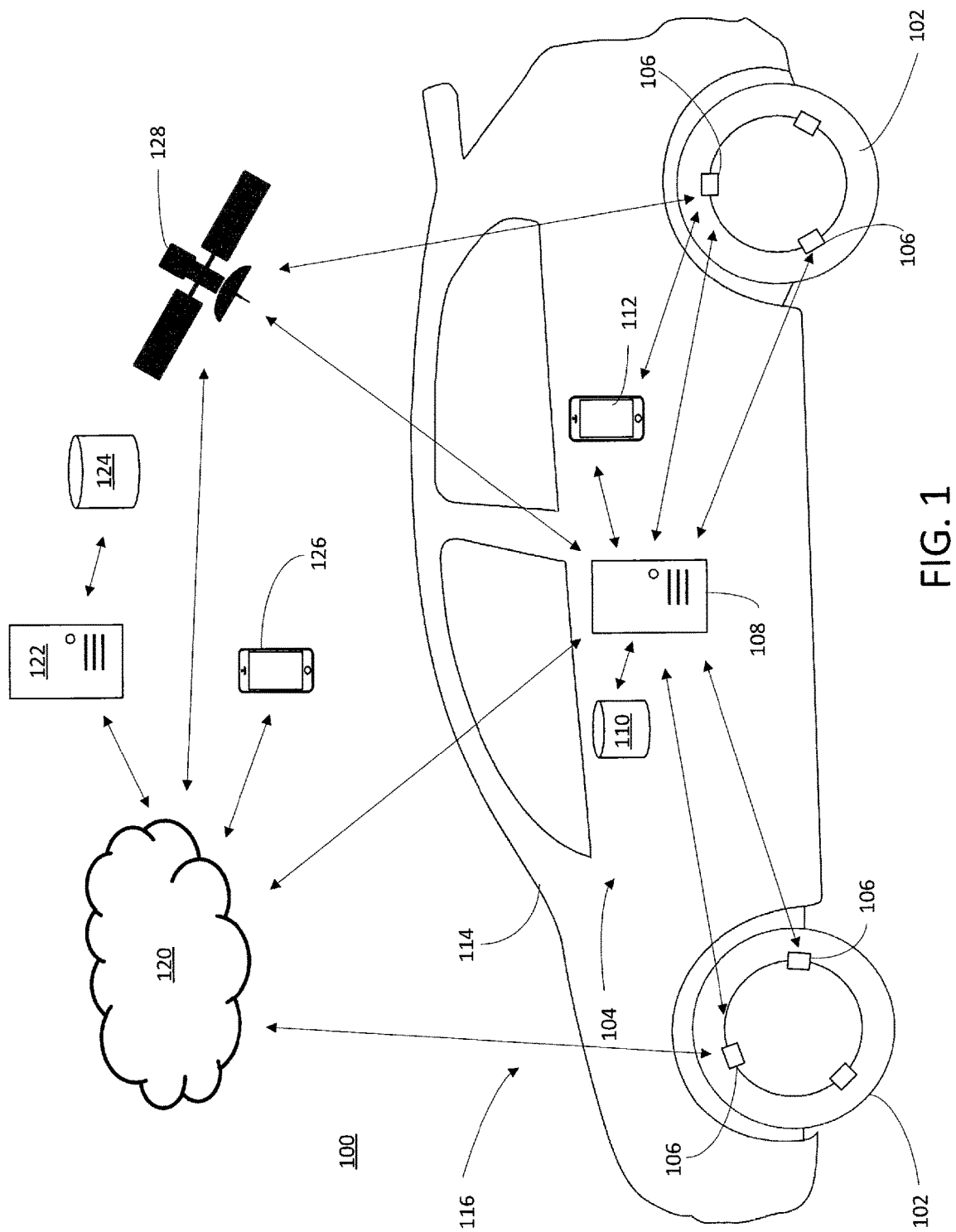
FIG. 1 is a diagram of a smart wheel sensor system that integrates at least one smart wheel, in accordance with various embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

As noted above, an inertial navigation system (INS) may be utilized to determine a position, orientation, and velocity of a moving object on a centralized, static part of a vehicle. The INS does not collect sensor data from a moving part such as a wheel. For example, an INS is unable to determine the temperature at a wheel. Furthermore, the INS is typically powered by a centralized power source of the vehicle, such as the vehicle's engine or a centralized battery. Additionally, sensors for a wheel such as a pressure monitoring device may rely on a low speed controller area network (CAN) bus to communicate.

Accordingly, a new approach is proposed that contemplates systems and methods for tire sidewall temperature sensing. This temperature sensing may be performed based on voltage values produced by a piezoelectric transducer that transforms tire deformations into voltage. The amount of voltage may be related to a tire sidewall temperature (e.g., at the tire sidewall that contacts the piezoelectric transducer). Also, in some embodiments, piezoelectric transducers may be placed on a rim of a wheel for more effective transformations of tire deformations into voltage.

In various embodiments, a piezoelectric transducer may produce sustained outputs at varying vehicle speeds based on the temperature of the rim and tire and weight of the vehicle acting on an underlying surface (e.g., a road) through the rim and tire. For example, vehicles may have wheels (e.g., wheels with pneumatic tires). A wheel, with an inflated tire and rigid rim, can exchange vehicular actions along a bead area of the tire that interfaces with the rigid rim. These vehicular actions may include traction, braking, steering, load support, and the like. As the wheel rotates, the lower part of the tire may apply forces in the bead area to counter the weight of the car. These forces may cause sidewalls of the wheel to bend and apply force to a piezoelectric transducer due to the internal air pressure of the tire (e.g., due to the intimate contact between a rubber tire and metal rim).

In various embodiments, the piezoelectric transducer may be arrayed around the circumference of the rim, generating voltage as the wheel rotates based on the temperature of a tire sidewall. In some embodiments when the piezoelectric transducer is mounted on the rim of the wheel, the piezoelectric transducer may be physically separable from the rim and/or the tire. Thus, the piezoelectric transducer need not be replaced or changed when the tire is replaced. The piezoelectric transducer may also be coupled with an energy storage device (e.g., a battery) to provide recharge cycles that can supply power to an array of sensors placed in, on, or proximate to the wheel. Accordingly, a piezoelectric transducer may utilize strain (e.g., mechanical strain indicative of relative motion/deflection) to generate voltage that may be utilized to determine a tire sidewall temperature as well as to power other devices or sensors proximate to the piezoelectric transducer.

In some embodiments, the piezoelectric transducer may be disposed along a circumference of a rotatable component (e.g., a rigid portion of a wheel that is configured to rotate). This piezoelectric transducer may be configured to generate a voltage (e.g., electric potential) based on a mechanical deformation of the piezoelectric transducer. Also, a processor may be in communication with the piezoelectric transducer and configured to determine a temperature value (e.g., a temperature) based on the generated voltage. The temperature value may represent the temperature of a flexible sidewall that contacts the piezoelectric transducer (e.g., based on the generated voltage). Stated another way, the rotatable component may be part of a wheel and the piezoelectric transducer may directly contact a flexible sidewall of the wheel. In particular embodiments, the at least one processor may be disposed within a vehicle body to which the rotatable component is mounted. In various embodiments, the piezoelectric transducer may include a voltage sensor configured to determine an offload voltage value of the offload voltage so that the processor may be configured to determine the temperature value based on the offload voltage value.

In various embodiments, the rotatable component may include a rim that includes an outer facing surface opposite an inner facing surface in which the circumference of the rotatable component is bound. The voltage sensor may be located within a central housing along the inner facing surface. Also, a tire that forms the flexible sidewall of a wheel may be coupled to the rotatable component such that the inflated tire may be configured to transfer force to the rotatable component resulting from compressive force acting on a portion of the tire making contact with a road (e.g., an underlying surface that the tire is traversing). Thus, the piezoelectric transducer may be configured to mechanically deform in response to the compressive force acting on the portion of the tire making contact with the road as the rotatable component rotates.

In a number of embodiments, a temperature of a tire may be determined based on an operational voltage value, a starting voltage value, and a starting temperature. The starting temperature may be a baseline temperature associated with a starting voltage value. This may be a known temperature value of the tire and/or a sidewall that the piezoelectric transducer is in contact with. The starting voltage value may be a voltage value (e.g., a single starting value and/or a normalized starting voltage value) produced by the piezoelectric transducer at the starting temperature while a wheel (which includes the tire) is rotating. Then, an operational voltage value (e.g., a single operational voltage value and/or a normalized operational voltage value) may be produced from the piezoelectric transducer when the tire is no longer at the known temperature (e.g., after the collection of the starting voltage value at the starting temperature). Accordingly, a predetermined relationship between the operational voltage value, the starting voltage value, and the starting temperature may be utilized to determine the operational temperature of the tire at the location of the piezoelectric transducer during collection of the operational voltage value. In some embodiments, this predetermined relationship may include a scaling of the starting temperature based on the operational voltage value and the starting voltage value.

In various embodiments, an action may be taken (e.g., production of an alert, notification, or a record recorded in a datastore) based on aggregated sensor data that includes the operational temperature. In some embodiments, a probability of tire rupture may be determined based on the operational temperature. For example, an action that is an alert may be produced in response to the probability of tire rupture exceeding a threshold value. This threshold value may be an outlier value determined using a statistical model applied to sensor data that comprises the operational temperature value. For example, this sensor data may include a historical operational temperature set based on the operational temperature value collected over a period of time.

In various embodiments, the piezoelectric transducer may include a piezoelectric material that is at least one of a crystal and semiconductor material or a polymer and organic material. Examples of a crystal and semiconductor material may include: polyvinylidene fluoride, gallium phosphate, sodium bismuth titanate, lead zirconate titanate, quartz, berlinite (AlPO4), sucrose (table sugar), rochelle salt, topaz, tourmaline-group minerals, lead titanate (PbTiO3), langasite (La3Ga5SiO14), gallium orthophosphate (GaPO4), lithium niobate (LiNbO3), lithium tantalate (LiTaO3), any of a family of ceramics with perovskite, tungsten-bronze, potassium niobate (KNbO3), sodium tungstate (Na2WO3), Ba2NaNb5O5, Pb2KNb5O15, sodium potassium niobate ((K,Na)NbO3) (e.g., NKN, or KNN), bismuth ferrite (BiFeO3), sodium niobate (NaNbO3), barium titanate (BaTiO3), bismuth titanate (Bi4Ti3O12), sodium bismuth titanate (NaBi(TiO3)2), zincblende crystal, GaN, InN, AN, and ZnO. Examples of a polymer and organic material may include: polyvinylidene fluoride (PVDF) and its copolymers, polyamides, and paralyne-C, polyimide and polyvinylidene chloride (PVDC), and diphenylalanine peptide nanotubes (PNTs).

In various embodiments, a piezoelectric transducer may be part of a smart wheel sensor system. For example, the piezoelectric transducer may be arrayed on a wheel of a vehicle (e.g., a wheel driven object) along with other sensors of the smart wheel sensor system. The smart wheel sensor system may include multiple types of sensors, which may each be configured to collect different types of smart wheel sensor system data. For example, the smart wheel sensor system may include a height sensor configured to produce barometric pressure sensor data; an acoustic sensor configured to produce acoustic sensor data; an image sensor configured to produce image sensor data; a gas sensor configured to produce gas sensor data; a magnetic sensor configured to produce magnetic sensor data; an accelerometer sensor configured to produce acceleration sensor data; a gyroscope sensor configured to produce gyroscopic sensor data; and a humidity sensor configured to produce humidity sensor data. The smart wheel sensor system data produced by the smart wheel sensor system may be centrally and locally analyzed at a vehicle that relies upon the smart wheel for movement (e.g., by a computer or server within or supported by the vehicle's body) to determine a status of the vehicle and/or an individual smart wheel. Advantageously, the smart wheel sensor system may be implemented in an autonomous vehicle, such as part of a backup sensor system to augment the autonomous vehicle's safety system. In various embodiments, an individual wheel on which devices of a smart wheel sensor system are arrayed may be referred to as a smart wheel.

FIG. 1 is a diagram of a smart wheel sensor system 100 that integrates at least one smart wheel 102, in accordance with various embodiments. The smart wheel sensor system 100 may include a local sensor system 104 (e.g., a local smart wheel sensor system) of multiple sensor platforms 106 arrayed on respective smart wheels 102. At least one of the sensor platforms 106 may include a piezoelectric transducer. Also, each of the sensor platforms and constituent piezoelectric transducers may be at regular intervals along the smart wheel (e.g., at 120 degree intervals across the smart wheel).

This local sensor system 104 may include a local smart wheel server 108 that communicates with the sensors within the sensor platform 106. Accordingly, each sensor platform 106 may include at least one sensor and also include ancillary interfaces, such as communication interfaces, for communication with the local smart wheel server 108. This local smart wheel server 108 may also be in communication with a local smart wheel datastore 110 and any local user devices 112, such as a smartphone. For ease of explanation, the term local may refer to devices that are bound within or on a vehicle body 114 or a smart wheel 102 of a vehicle 116.

In contrast, the term remote may refer to devices that are outside of the vehicle body 114 or smart wheel 102 of the vehicle 116. For example, the local smart wheel server 108 may be configured to communicate with a remote network 120, such as the Internet. This remote network 120 may further connect the local smart wheel server 108 with remote servers 122 in communication with remote datastores 124 or remote user devices 126. In addition, the local smart wheel server 108 may be in communication with external sensors or devices, such as a remote satellite 128 for global positioning system (GPS) information.

In various embodiments, the sensor platform 106 may be configured to communicate with the local smart wheel server 108 via a communications interface. This communications interface may enable devices to communicate with each other using any communication medium and protocol. Accordingly, the communications interface 280 may include any suitable hardware, software, or combination of hardware and software that is capable of coupling the sensor platform 106 with the local smart wheel server 108. The communications interface may be arranged to operate with any suitable technique for controlling information signals using a desired set of communications protocols, services or operating procedures. The communications interface may comprise the appropriate physical connectors to connect with a corresponding communications medium. In some embodiments, this communications interface may be separate from a controller area network (CAN) bus. For example, the communications interface may facilitate wireless communications within the local sensor system 104 (e.g., between the sensor platforms 106 and the local smart wheel server 108). Further discussion of such a communications interface is provided in greater detail below.

In some embodiments, the sensor platform 106 may be configured to communicate with the remote network 120. For example, the sensor platform 106 may communicate sensor data produced by the sensor platform 106 to the remote servers 122, the remote datastores 124, the remote user devices 126, and/or the remote satellite 128 via the remote network 120. In various embodiments, the sensor platform 106 may communicate directly with the remote network 120, the remote satellite 128, the user device 112, and/or the remote user device 126. For example, the sensor platform 106 may include communication interfaces (discussed further below) that may be configured to communicate directly with the remote network 120, the remote satellite 128, the user device 112, and/or the remote user device 126 in a manner that bypasses the local server 108.

In other embodiments, the sensor platform 106 may communicate indirectly with the remote network 120, the remote satellite 128, the user device 112, and/or the remote user device 126. For example, the sensor platform 106 may include communication interfaces (discussed further below) that may be configured to communicate indirectly with the remote network 120, the remote satellite 128, the user device 112, and/or the remote user device 126 via the local server 108 (e.g., where the communications are routed through the local server 108 as an intermediary). In some embodiments, the sensor platform 106 may communicate directly with the user device 112 (e.g., a smartphone) which can then communicate directly or indirectly with the local server 108, remote network 120, remote user device 126 and/or remote satellite 128. In further embodiments, the wheel 102 (e.g., serving as an antenna) and/or the sensor platform 106 may have a direct communication link with the remote user device 126 or remote satellite 128 (e.g., for purposes of internet access and/or GPS applications).

The communications from the sensor platform 106 to the remote server 122, whether direct or indirect, may include sensor data collected by the sensor platform for analysis by the remote server 122. This sensor data may be analyzed by the remote server 122 to determine an action that may be performed by the local server 108. For example, as will be discussed in further detail below, this sensor data (e.g., voltage values produced by a piezoelectric transducer) may be utilized to determine a parameter value (e.g., a value of a parameter such as an operational temperature and/or a probability of tire rupture). Then certain actions may be performed based on the state of the parameter value, such as in response to the parameter value meeting certain threshold values (e.g., for an alert or notification presented via a user interface). This determination of a parameter value may be performed at the remote server and then the parameter values communicated to the local server 108 to determine the action to be performed based on the state of the parameter value. In other embodiments, this determination of a parameter value and the determination of the resultant action may be performed by the remote server. Then the remote server may communicate an indication of the action to be performed to the local server for implementation (e.g., as an instruction to the local server for implementation). Although some embodiments describe sensor data as being communicated to a remote server for processing, sensor data may be processed in other manners as desired for different application in accordance with various embodiments. For example, the sensor data may be processed locally at the local server 108 with or without additional inputs provided from the remote server 122, remote user device, and/or remote satellite 128, as will be discussed further below.

In some embodiments, each of the sensor platforms and constituent piezoelectric transducers may be at regular intervals along the smart wheel (e.g., at 120 degree intervals across the smart wheel). Thus, these regularly spaced piezoelectric transducers may produce voltage values that may be utilized to infer a temperature at the location of the regularly spaced piezoelectric transducers (e.g., at regular locations along the smart wheel). For example, these regularly spaced piezoelectric transducers may produce voltage values as sensor data that may be utilized to determine a normalized or average temperature value for the smart wheel at the bead region in which the regularly spaced piezoelectric transducers sit (e.g., at a region contacting a flexible tire and a rigid rim).

Figure 2:
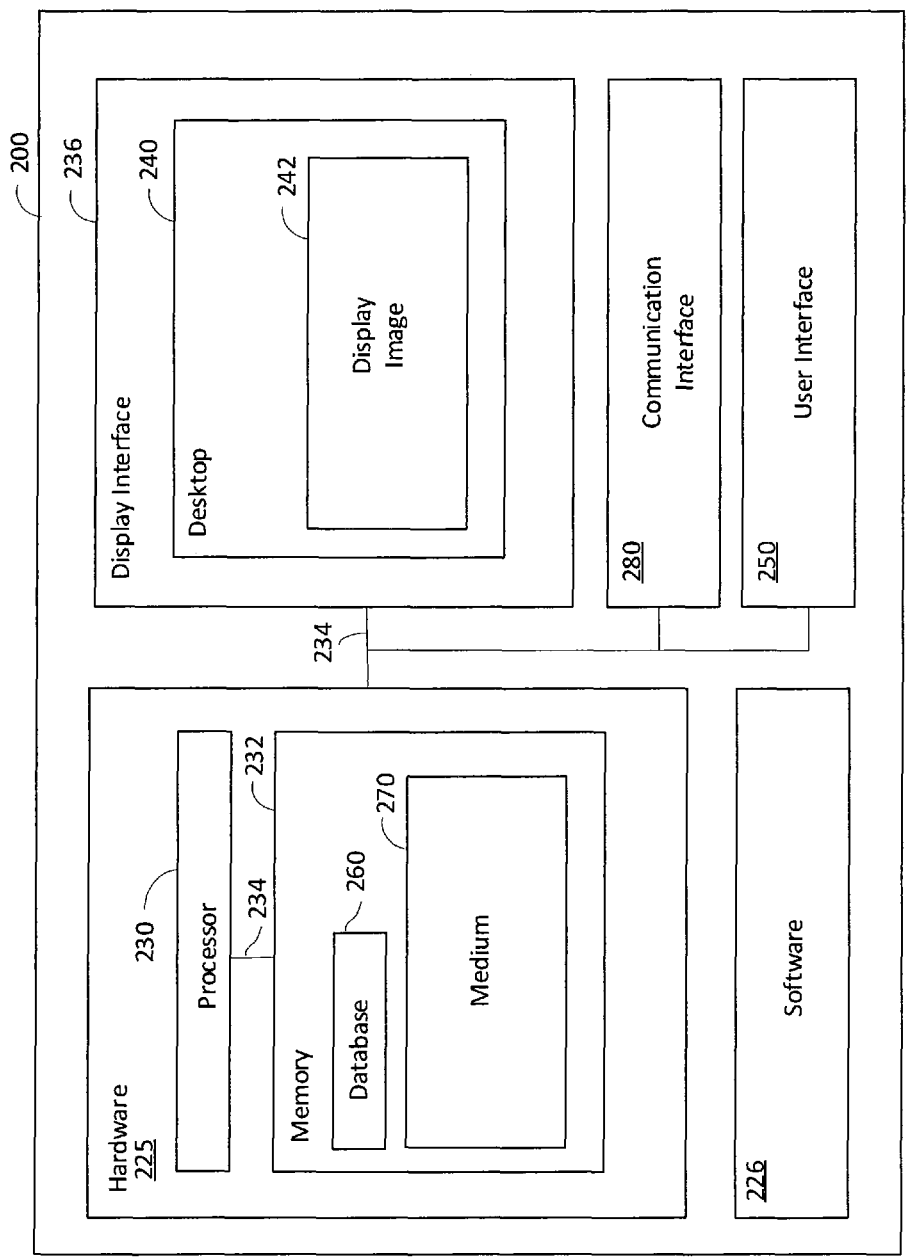
FIG. 2 is a block diagram of an exemplary computing device, in accordance with various embodiments.

FIG. 2 is a block diagram of an exemplary computing device 200, in accordance with various embodiments. As noted above, the computing device 200 may represent exemplary components of a particular local smart wheel server 108, local user device 112, remote server 122, remote user device 126, sensor platform 106, or remote satellite 128 as discussed above in connection with FIG. 1. Returning to FIG. 2, in some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in hardware unit 225 (e.g., as a system-on-a-chip, firmware, field-programmable gate array ("FPGA"), etc.). In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an application specific integrated circuit (ASIC), a digital signal processor (DSP), an attached support processor (ASP), a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a number of GB of RAM. Memory 232 can also be a ROM, a network interface (NIC), and/or other device(s).

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from a user. User interface 250 may include, for example, a keyboard, a pointing device, a mouse, a stylus, a touch sensitive panel (e.g., a touch pad or a touch screen), a position detector, and/or an audio input device. A single component, such as a touch screen, may function as both an output device of the media output component and the input interface. In some embodiments, mobile devices, such as tablets, can be used.

In some embodiments, the computing device 200 can include a database 260 as a datastore within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a local smart wheel server, a local user device, a remote server, a remote user device, a sensor platform, a remote satellite, a smartphone, a laptop PC, a desktop PC, a tablet, a Google™ Android™ device, an iPhone®, an iPad®, and a voice-controlled speaker or controller.

The computing device 200 has a communications interface 280, which enables the computing devices to communicate with each other, the user, and other devices over one or more communication networks following certain communication protocols, such as TCP/IP, http, https, ftp, and sftp protocols. Here, the communication networks can be but are not limited to, the Internet, an intranet, a wide area network (WAN), a local area network (LAN), a wireless network, Bluetooth, WiFi, and a mobile communication network (e.g., 4G-LTE and/or 5G networks).

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless.

A network may be utilized as a vehicle of communication. In various aspects, the network may comprise local area networks (LAN) as well as wide area networks (WAN) including without limitation the Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols, including fiber optic communication protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising (e.g., including) one or more antennas, transmitters, receivers, transceivers, amplifiers, filters, control logic, and so forth.

In various aspects, the communications interface 280 may provide data communications functionality in accordance with a number of communication protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, 4G-LTE, 5G and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 3A:
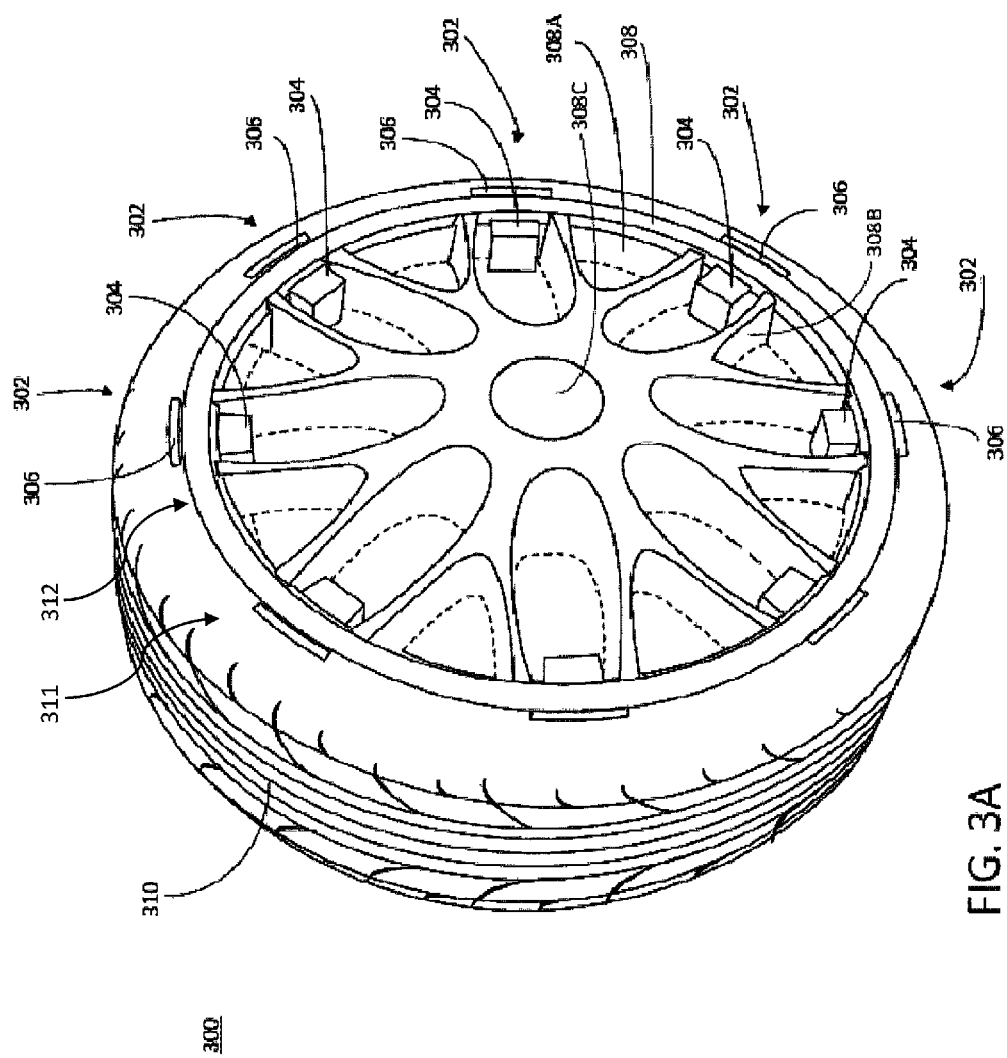
FIG. 3A is a perspective illustration of a smart wheel, in accordance with various embodiments.

FIG. 3A is a perspective illustration of a smart wheel 300, in accordance with various embodiments. The smart wheel 300 may include at least one sensor platform 302. Each sensor platform 302 may include a central housing 304 and a piezoelectric transducer 306. As will be discussed further below, each sensor platform may be supported (e.g., be positioned along) a rotatable component 308 of the smart wheel 300. The rotatable component 308 may include, for example, a rim of the smart wheel 300 within which a circumference of the rotatable component 308 is bound. Although each sensor platform 302 may include a single central housing 304 and a single piezoelectric transducer 306 in some embodiments, any number of central housings and piezoelectric transducers may be implemented in a sensor platform as desired for different applications in various embodiments. For example, other embodiments may include multiple central housings for each piezoelectric transducer and yet further embodiments may include multiple piezoelectric transducers for each central housing. Although some embodiments describe the central housing 304 as being located directly on a rim 308A of the smart wheel 300 (e.g., on the rim of the rotatable component 308 of the smart wheel 300), the central housing may also be located in other parts of a smart wheel 300 as desired for different applications in various embodiments. For example, the central housing (and the constituent components of the central housing) may be located closer to the center of the rotatable component 308, such as along the spokes 308B of the rotatable component 308 or around the center 308C (e.g., proximate a cap) of the rotatable component 308 in particular embodiments.

The piezoelectric transducer 306 may be positioned along the rotatable component 308 (e.g., a rim) of the smart wheel 300 in a manner configured to capture a kinetic energy in response to a compressive force acting on a flexible component 310 (e.g., a pneumatic or inflatable tire, tube, etc.) of the smart wheel 300 making contact with a road or object as the rotatable component 308 rotates. In some embodiments, the piezoelectric transducer 306 and/or the sensor platform 302 may be visible from a lateral side of a vehicle or smart wheel 300 (e.g., adjacent a lateral sidewall 311 of the vehicle or smart wheel 300). However, in other embodiments, the piezoelectric transducer 306 and/or the sensor platform 302 may not be visible from the lateral side of the vehicle or smart wheel 300. The voltage produced by the piezoelectric transducer 306 may be used to determine a temperature of the flexible component 310 and/or the rotatable component 308 at the location of the piezoelectric transducer 306. In some embodiments, this voltage may represent energy that may also power various components of the sensor platform 302, such as various sensors and/or communication interfaces within the central housing 304.

In various embodiments, the piezoelectric transducer 306 may be positioned on a side wall of the rotatable component 308. For example, the piezoelectric transducer 306 may be positioned between a bead area 312 of the flexible component 310 (e.g., a tire, tube, belt, etc.) and the rotatable component 308 (e.g., a rim, wheel, shaft, etc.). Accordingly, the flexible component 310 may be mounted on the rotatable component 308. The piezoelectric transducer 306 may produce voltage resulting from a compressive force of transport acting on the bead area 312 of the flexible component 310 (e.g., tire, tube, etc.).

Figure 3B:
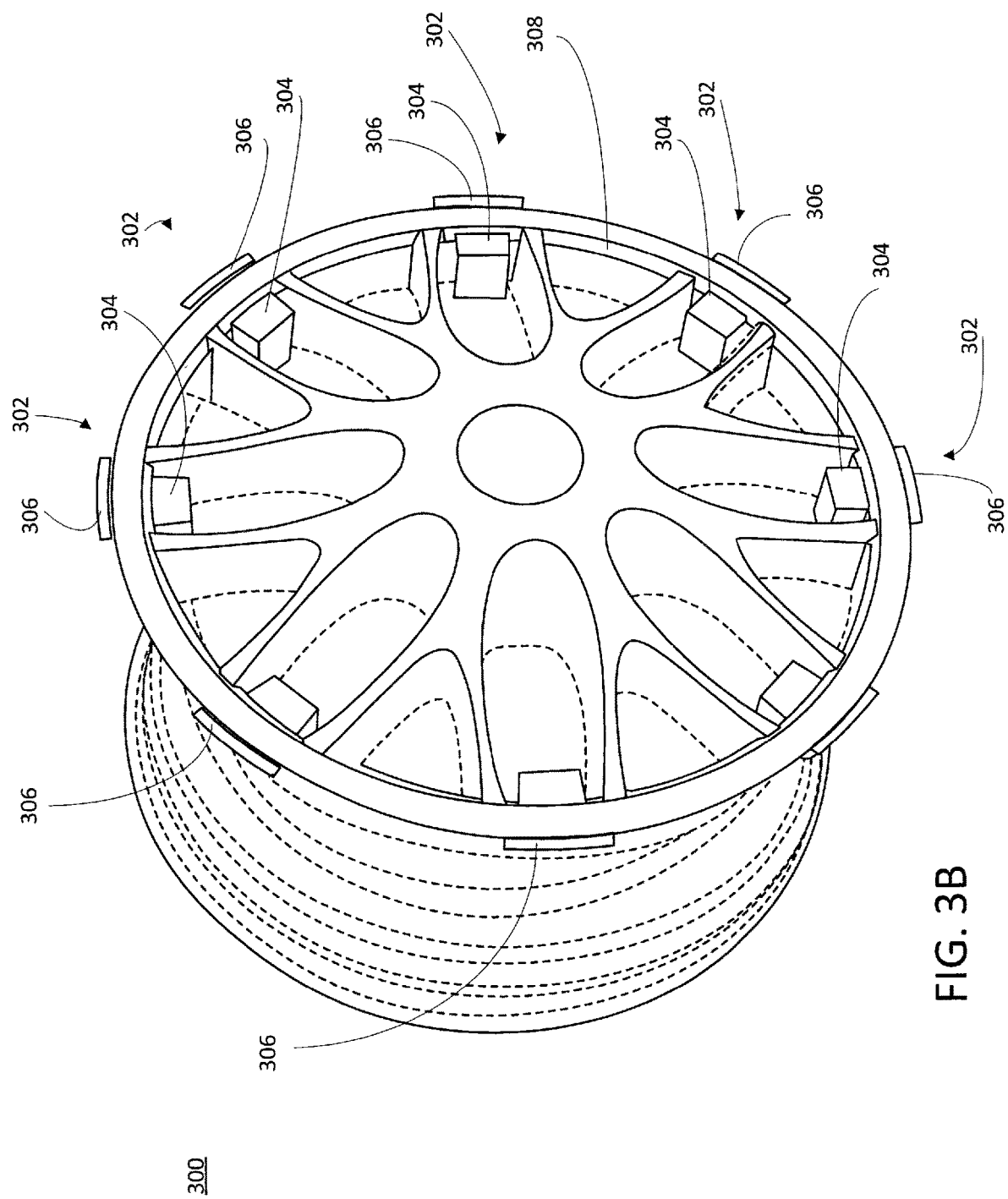
FIG. 3B is a perspective illustration of the smart wheel without the flexible component, in accordance with various embodiments.

FIG. 3B is a perspective illustration of the smart wheel 300 without the flexible component, in accordance with various embodiments. As illustrated, the piezoelectric transducer 306 may be positioned around a circumference of the rotatable component 308. Accordingly, the piezoelectric transducer 306 may generate energy (e.g., voltage) resulting from compressive force of a moving object (e.g., a vehicle, acting on the bead area of the tire mounted on the rotatable component 308). In some embodiments, the compressive force may be due to loading (e.g., acceleration, deceleration, etc.). Also, the amount of the compressive force may be based on the temperature of the smart wheel 300 experienced at the piezoelectric transducer (e.g., at the sidewall in direct contact with the piezoelectric transducer 306). In further embodiments, the piezoelectric transducer 306 may capture a kinetic energy of the transport moving in response to the rotatable component 308 rotating. Accordingly, the piezoelectric transducer 306 may generate energy (e.g., voltage) when mechanical stress is applied to the piezoelectric transducer 306.

Figure 4:
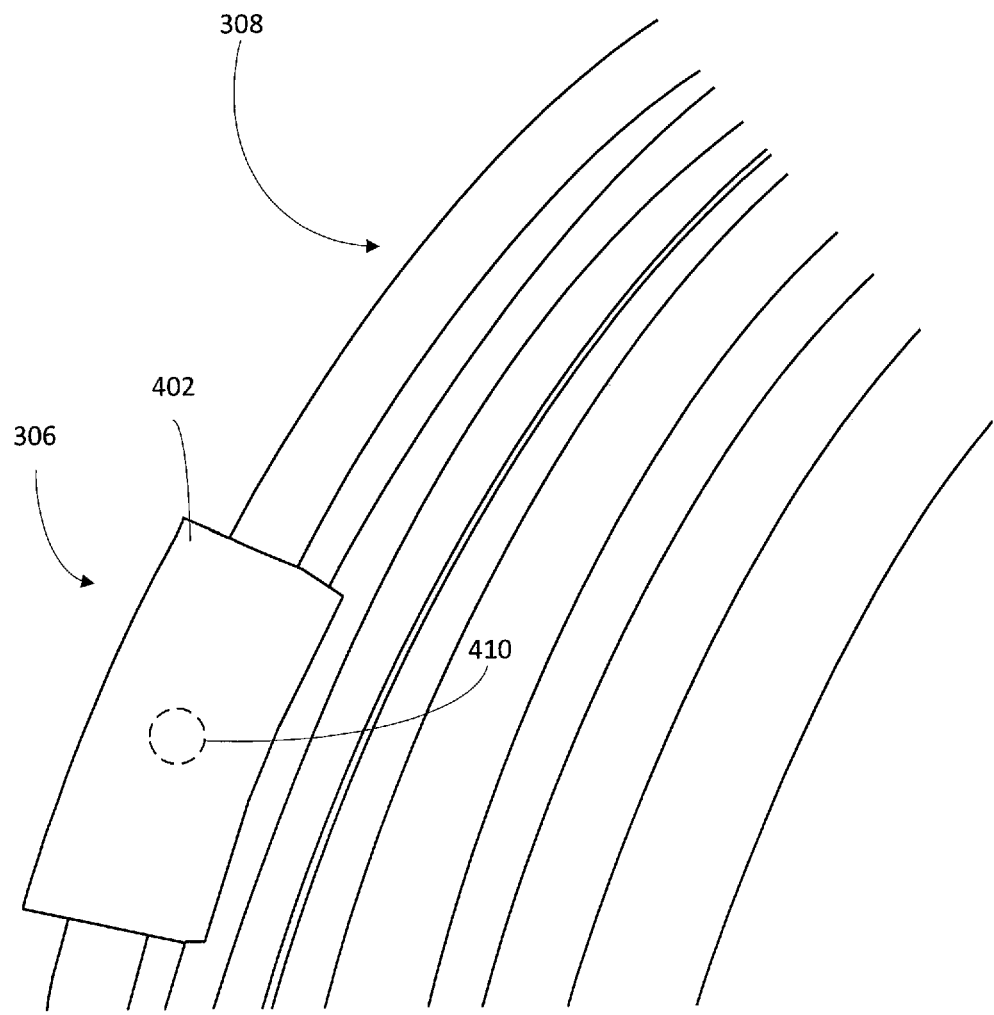
FIG. 4 is a perspective illustration of the piezoelectric transducer, in accordance with various embodiments.

FIG. 4 is a perspective illustration of the piezoelectric transducer 306, in accordance with various embodiments. The piezoelectric transducer 306 may be positioned along a circumference of the rotatable component 308 (e.g., the rim). The piezoelectric transducer 306 may include a backing portion 402 that contacts the rotatable component 308. The backing portion 402 may support a piezoelectric transducer. The piezoelectric transducer 306 may also include a conductive pin 410 (illustrated in phantom) or other conductive line (e.g., that may be flexible and not necessarily rigid) that may connect the piezoelectric transducer to a central housing (discussed further below). This conductive pin 410 may be connected to the piezoelectric material so as to transfer electric potential produced by the piezoelectric material to the central housing. Accordingly, the conductive pin 410 may include a conductive material to transfer the energy produced by the piezoelectric material to the central housing.

Figure 5A:
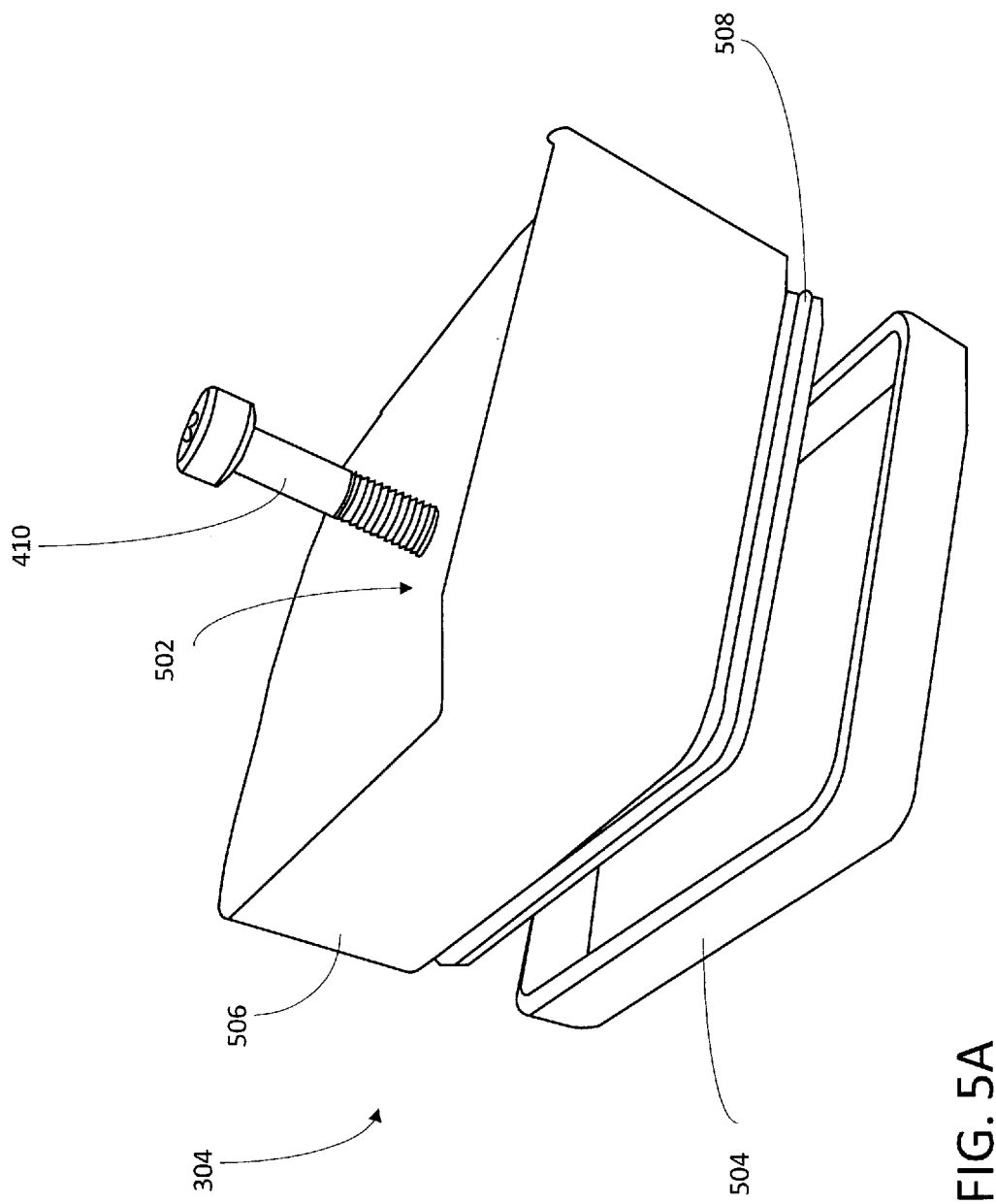
FIG. 5A illustrates a perspective view of a central housing of the piezoelectric transducer with a conductive pin, in accordance with various embodiments.

FIG. 5A illustrates a perspective view of the central housing 304 with a conductive pin 410, in accordance with various embodiments. The central housing 304 may include a curved feature 502 to conform the central housing 304 with a curvature of the rotatable component. The central housing 304 may include a cover 504 that may be removably attached to a main portion 506 of the central housing 304. For example, the cover 504 may be removably attached to the main portion 506 of the central housing 304 via screws, a latch, or any other type of removable attachment device that may attach the cover 504 to the main portion 506. Also, the main portion 506 may include a gasket 508 to prevent the ingress of undesirable particulate (e.g., water, snow, salt, dirt, or other ambient particulates).

Figure 5B:
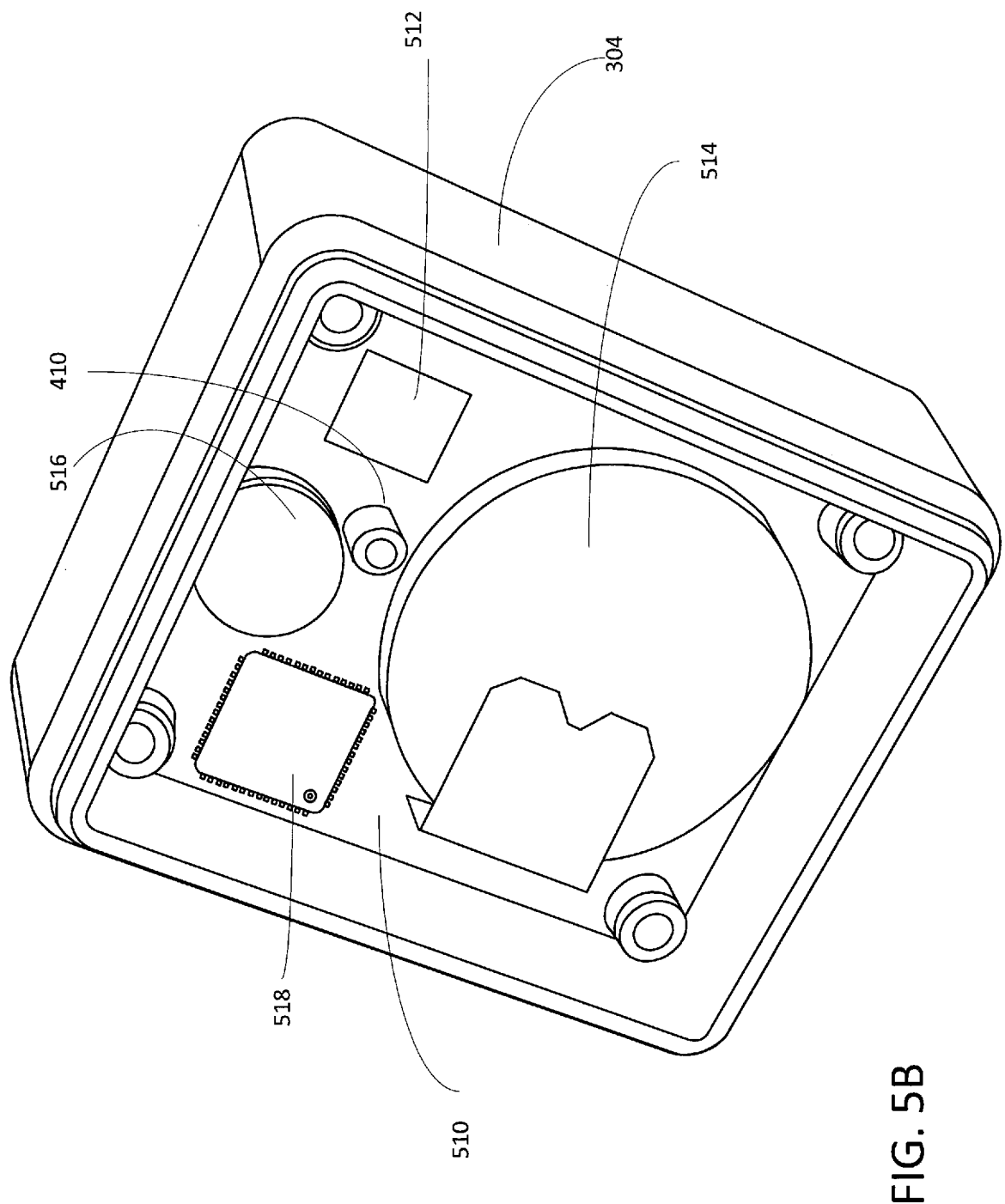
FIG. 5B illustrates a perspective view of a sensor integrator platform within the central housing, in accordance with various embodiments.

FIG. 5B illustrates a perspective view of a sensor integrator platform 510 within the central housing 304, in accordance with various embodiments. The sensor integrator platform 510 may integrate various sensors 512 (e.g., sensor components physically separate from the structure of the piezoelectric transducer) together within the central housing 304 along with functional modules such as, for example, a battery 514 or other energy storage medium configured to store energy produced by the piezoelectric transducer, as received via the conductive pin 410. In some embodiments, the sensor integrator platform 510 may include a system bus (e.g., a conductive element of a printed circuit board) that connects the various portions of the sensor integrator platform 510 together.

Furthermore, the sensor integrator platform may include other functional modules, such as a communications interface 516 to communicate the sensor data captured by the various sensors of the sensor integrator platform 510 to a local smart wheel server. This communications interface may include, for example, a communications interface for data offload (e.g., via millimeter and/or gigahertz wavelength communications) to a local smart wheel server, to other vehicles, an infrastructure (e.g., a remote network) and/or user devices. As a further example, this communication interface may facilitate wireless communications, such as via Bluetooth, radio frequency, radio wave, ultrasonic, and/or any other type of communication protocol or medium. This communication interface may be configured to communicate with, for example, on board electronic control units (ECUs) and/or advanced driver-assistance (ADAS) systems on a vehicle. Additionally, the sensor integrator platform 510, optionally, may include a processor 518 or any other circuitry to facilitate the collection, communication, and/or analysis of sensor data produced by the constituent sensors of the sensor integrator platform 510.

The sensor 516 may include one or more of various types of sensors, which may be integrated within the sensor integrator platform 510, in accordance with various embodiments. For example, the sensor 516 may include a voltage sensor that may sense an amount of electric potential (e.g., voltage) produced by the piezoelectric transducer 306. This voltage sensor may be configured to measure the amount of electric potential produced by the piezoelectric transducer 306 for the determination of a temperature at a flexible component (e.g., a tire) of the smart wheel. In some embodiments, the voltage sensor may also be configured to wake up, or otherwise activate the sensors and/or functional modules of the sensor integrator platform 510 when a sufficient amount of electric potential is produced by the piezoelectric transducer 306. For ease of discussion, in various embodiments, the voltage sensor may include the piezoelectric transducer such that the voltage sensor is configured to determine a voltage value or level produced by the piezoelectric transducer for temperature determination. In further embodiments, the voltage sensor may include the piezoelectric transducer and be configured to transition various sensors and/or functional modules of the sensor integrator platform from a low power or inactive state to a powered on or active state based on the piezoelectric transducer producing more than a threshold amount of energy in response to mechanical deformation at particular temperatures. In some embodiments, the electric potential (e.g., voltage) sensed by the voltage sensor may be stored in a battery for standby power when the piezoelectric transducer is not producing any energy (e.g., when there is no mechanical stress applied to the piezoelectric transducer).

In particular embodiments, the sensor 516 may include a height sensor configured to produce barometric pressure sensor data. In some embodiments, the height sensor is configured to also measure a deflection of an inner tire surface due to vehicle loads or a contact patch. In some embodiments, a distance measuring sensor can be placed into the pressurized portion of a tire. As the tire rotates, the distance of the tire relative to the central rotating rim changes. This periodic change of distance is detectable by the height sensor. Accordingly, this height sensor may be a barometric sensor or a barometric air pressure sensor that may measure atmospheric pressure, which may be indicative of an altitude or height. This barometric pressure sensor data may be utilized, for example, to determine a height of a smart wheel from a point of reference such as a road and/or relative to other smart wheels of a vehicle. This may allow for determination of roll over risk or a flat tire. As noted above, height sensors on a smart wheel may be on a rotatable component of a wheel and thus not on a chassis of a vehicle. Thus, such height sensors may be able to provide barometric pressure sensor data on which side (e.g., which smart wheel) initiated a roll over (e.g., when such barometric pressure sensor data is produced and recorded in a continuous or semi continuous manner). Furthermore, road conditions, such as pot holes, can be more accurately sensed by barometric sensor data produced by a smart wheel, in comparison to sensor data produced from a static part of a chassis of a vehicle.

In further embodiments, the sensor 516 may include an acoustic sensor configured to produce acoustic sensor data. Accordingly, this acoustic sensor may be any type of acoustic, sound, or vibrational sensor such as a geophone, a microphone, a seismometer, and a sound locator, and the like. The acoustic sensor data may be utilized for audio pattern recognition, such as to sense an audio signature of a brake or a rotor of a rotatable component (e.g., a wheel). This may be used for predicting a vehicle servicing schedule and/or to produce performance optimization data. More specifically, the acoustic sensor data may be analyzed to identify and/or monitor for unique signatures for different breaking and wear out conditions.

In various embodiments, the sensor 516 may include an image sensor configured to produce image sensor data from variable attenuation of waves. Examples of image sensors may include are semiconductor charge-coupled devices (CCD) or active pixel sensors in complementary metal-oxide-semiconductor (CMOS) or N-type metal-oxide-semiconductor (NMOS) technologies. In various embodiments, a sensor platform that includes an image sensor may include a lens, or other transparent medium on which the light waves are focused from outside of the central housing 304 onto the image sensor. In particular embodiments, this image sensor may be more specifically a time of flight sensor to capture time of flight data that may characterize a time of flight (TOF). This time of flight sensor may be, for example, an ultrasonic TOF sensor configured to collect ultrasonic TOF sensor data. As a more specific example, an image sensor may function as a camera for determination of a visibility of tire tread depth for assessment of tire performance and optimization. Such an image sensor that captures image data characterizing a tire tread depth may also be positioned in a manner such that image data of a tire tread may be captured (e.g., by having such an image sensor capture image data characterizing a tread depth of a smart tire that the image sensor is located on, or of a tire that the image sensor is not located on). As another specific example, an image sensor may include a infrared image sensor for authentication or identification. This infrared sensor may be utilized, for example, to scan for characteristics of a local environment or local object (e.g., a person approaching a vehicle) for authentication.

In particular embodiments, the sensor 516 may include a gas sensor configured to produce gas sensor data. This gas sensor may be any type of sensor to monitor and characterize a gaseous atmosphere. For example, the gas sensor may utilize any of a variety of mechanisms for gas detection, such as an electrochemical gas sensor, a catalytic bead gas sensor, a photoionization gas sensor, an infrared point gas sensor, a thermographic gas sensor, a semiconductor gas sensor, an ultrasonic gas sensor, a holographic gas sensor, and the like. These gas sensors may, for example detect for certain types of gases, such as exhaust gases, explosive gases (e.g., for battery failure detection), atmospheric humidity, air quality, particulates, a pH level, and the like.

In particular embodiments, the sensor 516 may include a magnetic sensor configured to produce magnetic sensor data. This magnetic sensor maybe, for example, a magnetometer that measures magnetism for navigation using magnetic field maps (e.g., inside a building or within a closed environment).

In additional embodiments, the sensor 516 may include an accelerometer sensor configured to produce acceleration sensor data and/or a gyroscope sensor configured to produce gyroscopic sensor data. This acceleration sensor data and/or gyroscopic sensor data may be utilized for navigation, such as to determine an amount of acceleration for the application of emergency brake systems. In some embodiments, the accelerometer sensor and/or gyroscope sensor may be part of an inertial navigation system (INS) located on a smart wheel.

Figure 6:
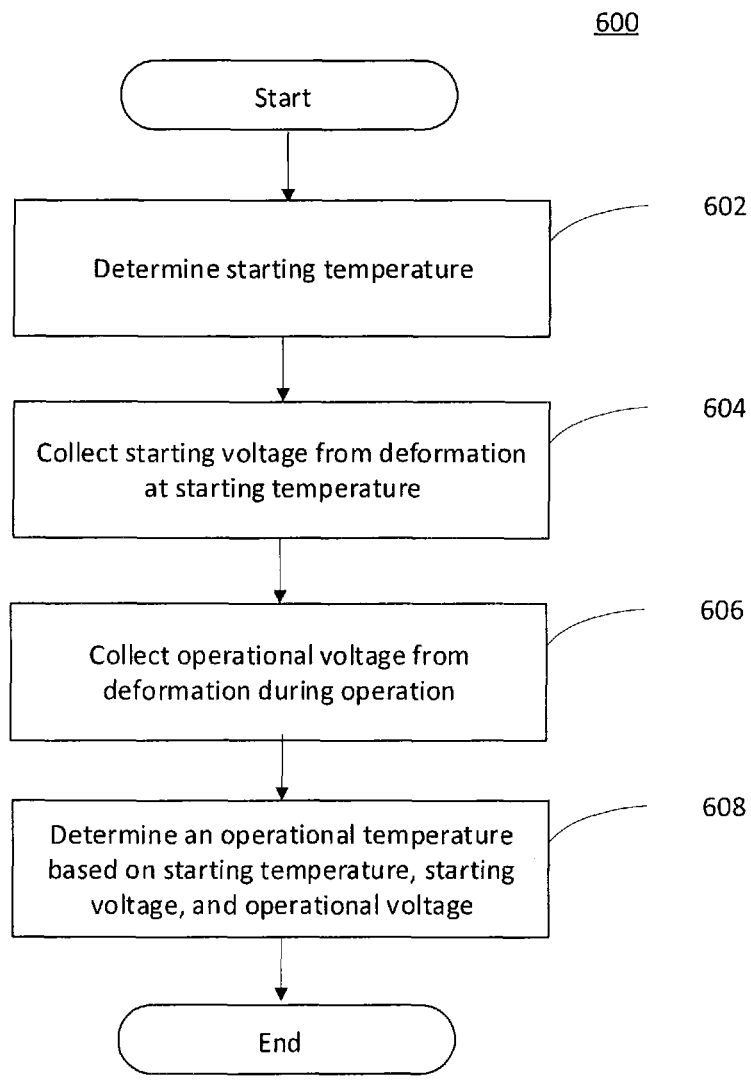
FIG. 6 is a flow chart of a temperature sensing process, in accordance with various embodiments.

FIG. 6 is a flow chart of a temperature sensing process 600, in accordance with various embodiments. The process 600 may be performed at a smart wheel sensor system of multiple sensor platforms arrayed on respective smart wheels in communication with at least one processor (e.g., a local smart wheel server or other computing device, as introduced above). It is noted that the process 600 is merely an example, and is not intended to limit the present disclosure. Accordingly, it is understood that additional operations (e.g., blocks) may be provided before, during, and after the process 600 of FIG. 6, certain operations may be omitted, certain operations may be performed concurrently with other operations, and that some other operations may only be briefly described herein.

At block 602, a starting temperature may be determined. In some embodiments, this starting temperature may be determined by retrieval from a datastore or memory by a smart wheel processor. More specifically, the starting temperature may be a baseline temperature at the piezoelectric transducer manually taken at a time associated with a starting voltage (discussed further below). For example, this starting temperature may be predetermined from a factory or operator's settings based on a particular time of operation within a controlled environment. In other embodiments, the starting temperature may be an ambient temperature of a smart wheel (e.g., a vehicle to which the smart wheel is mounted) when the starting voltage is collected. In various embodiments, this starting temperature may be measured using a thermometer, infrared camera, or other technique of reading a temperature at a particular location.

At block 604, the starting voltage may be collected from the smart wheel operating at the starting temperature. More specifically, the piezoelectric transducer may deform (e.g., mechanically deform) to generate energy (e.g., the starting voltage) resulting from compressive force of a moving object (e.g., a vehicle, acting on the bead area of the tire mounted on the rotatable component) while the piezoelectric transducer is operating at the known starting temperature. Stated another way, the piezoelectric transducer may capture a kinetic energy of a transport moving in response to the rotatable component rotating at the starting temperature (e.g., such that the starting temperature and the starting voltage is collected at a same time). This energy may be in the form of an alternating current (AC) signal, which can be rectified into a direct current (DC) signal. In some embodiments, the AC signal is rectified by a rectification circuit contained within the sensor 516 or a separate circuit within sensor integrator platform 510.

In various embodiments, the energy (e.g., the starting voltage) generated by the piezoelectric transducer may be transferred to a sensor integrator platform of a sensor platform that includes the piezoelectric transducer. As noted above, this energy may be transferred by, for example, a pin made of a conductive material (e.g., a conductive pin) or other conductive line (e.g., a flexible conductive line) to transfer the energy from the piezoelectric transducer to the sensor integrator platform. The sensor integrator platform may include a voltage sensor that may determine an amount (e.g., a value) of the starting voltage produced by the piezoelectric transducer.

At block 606, an operational voltage may be collected from the smart wheel operating at an unknown operational temperature. This operational temperature is as of yet unknown as it is an operational temperature that is yet to be determined based on the operational voltage, the starting voltage, and the starting temperature. More specifically, the piezoelectric transducer may deform (e.g., mechanically deform) to generate energy (e.g., the operational voltage) resulting from compressive force of a moving object (e.g., a vehicle, acting on the bead area of the tire mounted on the rotatable component) while the piezoelectric transducer is operating at the unknown operational temperature. As noted above, the piezoelectric transducer may capture a kinetic energy of a transport moving in response to the rotatable component rotating at the starting temperature. This energy may be in the form of an alternating current (AC) signal, which can be rectified into a direct current (DC) signal.

In various embodiments, the energy (e.g., the operational voltage) generated by the piezoelectric transducer may be transferred to a sensor integrator platform of a sensor platform that includes the piezoelectric transducer. As noted above, this energy may be transferred by, for example, a pin made of a conductive material (e.g., a conductive pin) or other conductive line (e.g., a flexible conductive line) to transfer the energy from the piezoelectric transducer to the sensor integrator platform. As noted above, the sensor integrator platform may include the voltage sensor that may determine an amount (e.g., a value) of the operational voltage produced by the piezoelectric transducer.

At block 608, the operational temperature may be determined based on the starting temperature, the starting voltage, and the operational voltage. The operational temperature may be the temperature of the flexible component (e.g., tire sidewall) in contact with the piezoelectric transducer that imparts the compressive force to the piezoelectric material of the piezoelectric transducer as the piezoelectric transducer produces the operational voltage. For example, each of the starting temperature, the starting voltage, and the operational voltage may represent a parameter analyzed by the at least one processor (e.g., a local smart wheel server or other computing device, as introduced above). The at least one processor may determine the operational temperature based on the following relationship:

$$T_o = \left(\frac{V_o}{V_s}\right) T_s \quad (1)$$

Where $T_o$ is the operational temperature, $V_o$ is the operational voltage, $V_s$ is the starting voltage, and $T_s$ is the starting voltage.

In some embodiments, the starting temperature, the starting voltage, and the operational voltage may be communicated locally to a local smart wheel server from the sensor platforms arrayed on a smart wheel for determination of the operational temperature. This communication may be made via a communications interface. This communications interface may enable devices to communicate with each other using any communication medium and protocol. Accordingly, the communications interface may include any suitable hardware, software, or combination of hardware and software that is capable of coupling the respective sensor platforms with the local smart wheel server. The communications interface may be arranged to operate with any suitable technique for controlling information signals using a desired set of communications protocols, services or operating procedures. In some embodiments, this communications interface may be separate from a controller area network (CAN) bus, and thus have lower latency than communications across the CAN bus.

Figure 7:
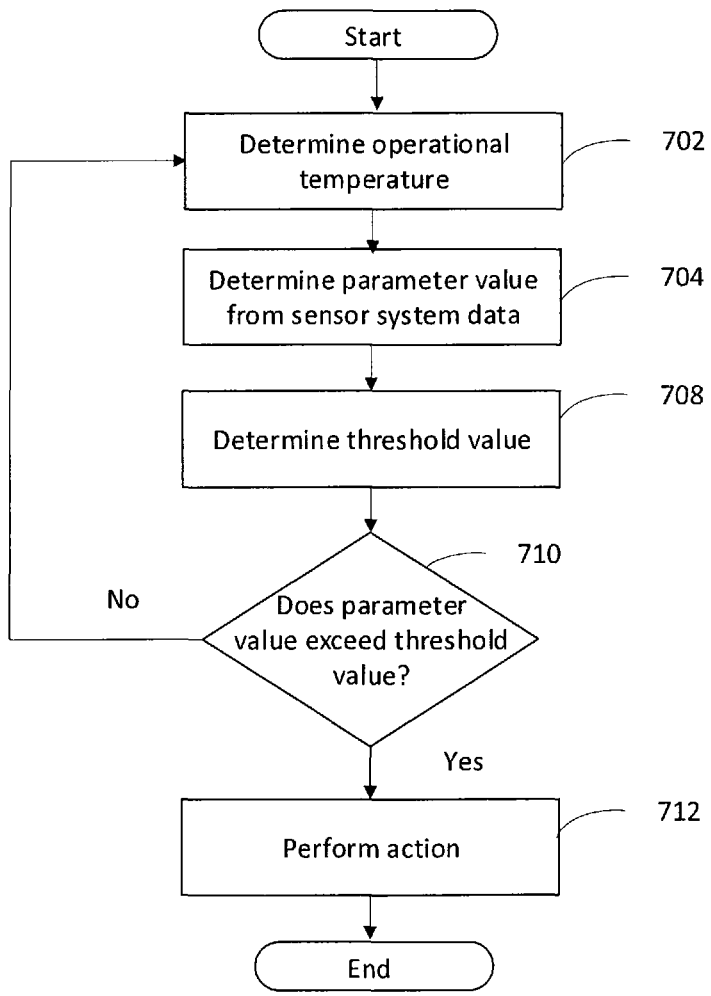
FIG. 7 is a flow chart of a smart wheel process, in accordance with various embodiments.

FIG. 7 is a flow chart of a smart wheel process 700, in accordance with various embodiments. The process 700 may be performed at a smart wheel sensor system of multiple sensor platforms arrayed on respective smart wheels in communication with a local smart wheel server, as introduced above. It is noted that the process 700 is merely an example, and is not intended to limit the present disclosure. Accordingly, it is understood that additional operations (e.g., blocks) may be provided before, during, and after the process 700 of FIG. 7, certain operations may be omitted, certain operations may be performed concurrently with other operations, and that some other operations may only be briefly described herein.

At block 702, an operational temperature may be determined based on the starting temperature, the starting voltage, and the operational voltage. This operational temperature may be determined in accordance with the temperature sensing process 600 of FIG. 6, discussed above, and thus will not be repeated here for brevity. Also, this operational temperature may be part of smart wheel sensor system data (e.g., be one type of sensor data and/or a parameter produced and/or analyzed by the smart wheel sensor system).

Returning to FIG. 7, at block 704, a parameter value may be determined from a totality of relevant smart wheel sensor system data. The difference between sensor data and a parameter value may be that parameter value may refer to a value that may be further analyzed against a threshold value while sensor data may be data produced by a sensor without a further comparison or analysis against a threshold, in accordance with some embodiments. Accordingly, an operational temperature may be a parameter value in some embodiments and sensor data from which a parameter value may be determined in other embodiments. In embodiments, where the parameter value is the operational temperature, no further collection of sensor data and/or analysis may be required beyond noting that the operational temperature is determined and is the parameter value.

As discussed above, a smart wheel may be a wheel of a vehicle with a local network connected sensor system of at least one sensor arrayed on the wheel itself. The smart wheel sensor system may include multiple types of sensors, which may each be configured to collect different types of smart wheel sensor system data beyond an operational temperature and/or voltage data produced by the piezoelectric transducer for temperature determination. For example, the smart wheel sensor system may include one or more of the following: a height sensor configured to produce barometric pressure sensor data; an acoustic sensor configured to produce acoustic sensor data; an image sensor configured to produce image sensor data; a gas sensor configured to produce gas sensor data; a magnetic sensor configured to produce magnetic sensor data; an accelerometer sensor configured to produce acceleration sensor data; a gyroscope sensor configured to produce gyroscopic sensor data; and a humidity sensor configured to produce humidity sensor data. In some embodiments, these sensors may be woken up by a shock sensor that may sense an amount of energy (e.g., voltage) produced by the piezoelectric transducer.

In some embodiments, the smart wheel sensor system data may be communicated locally to a local smart wheel server from the sensor platforms arrayed on a smart wheel. This communication may be made via a communications interface. This communications interface may enable devices to communicate with each other using any communication medium and protocol. Accordingly, the communications interface may include any suitable hardware, software, or combination of hardware and software that is capable of coupling the respective sensor platforms with the local smart wheel server. The communications interface may be arranged to operate with any suitable technique for controlling information signals using a desired set of communications protocols, services or operating procedures. In some embodiments, this communications interface may be separate from a controller area network (CAN) bus, and thus have lower latency than communications across the CAN bus.

Accordingly, the smart wheel sensor system data may be analyzed or processed to determine a parameter value. This parameter value may characterize any type of real world parameter, such as a probability of tire rupture. In some embodiments, this parameter value may characterize a combination of different types of local smart wheel sensor system data and/or a combination of local smart wheel sensor system data with other data accessible to the local smart wheel server, wherein the combination may be expressed as a predetermined formula. For example, this parameter value may characterize a combination of one or more of: barometric pressure sensor data; acoustic sensor data; image sensor data; gas sensor data; magnetic sensor data; acceleration sensor data; gyroscopic sensor data; humidity sensor data, and the like. As another example, this parameter value may characterize a combination of local smart wheel sensor system data with other data, whether predetermined (e.g., vehicle build and other specifications) or received from outside of local smart wheel sensor system data (e.g., remote data, such as GPS data received from a satellite or data received from a remote server over a remote network). For example, the parameter value may take into consideration (e.g., reflect) any of a variety of inputs, such as mileage, wheel dynamics, tire pressure, load conditions, road conditions, balancing information, height conditions, ambient sounds, brake dynamics, and the like.

In various embodiments, a parameter value may represent a probability (e.g., a probability of failure, such as a probability of tire rupture) as determined via application of a statistical model determined or trained by the local smart wheel server and/or a remote server. This statistical model may be trained using historical aggregated data (e.g., historical aggregated data of the local smart wheel sensor system or among multiple smart wheel sensor systems). This training may be produced using machine learning techniques (e.g., via supervised or unsupervised learning). These machine learning techniques may be, for example, decision tree learning, association rule learning, artificial neural networks, deep structured learning, inductive logic programming, support vector machines, cluster analysis, Bayesian networks, representation learning, similarity learning, sparse dictionary learning, learning classifier systems, and the like. Then, this statistical model may be applied to new or current smart wheel sensor data, to determine current parameter values (e.g., probabilities of failure). Such a statistical model may account for hidden variables, interaction variables, and the like to express such a probability. For example, these probabilities may represent a probability of tire rupture or other tire failure based at least in part on the operational temperature.

At block 708, the local smart wheel server may determine a threshold value. In some embodiments, these threshold values may be determined on the fly and determined alongside a determination of whether a parameter value meets (e.g., exceeds) a threshold value. However, in other embodiments, threshold determination may be done prior to a determination of whether a parameter value meets a threshold value. In some embodiments, the determination of parameter values may include retrieving predetermined parameter values from memory or from a remote server.

In various embodiments, a threshold value may be determined for each type of parameter value. For example, there may be separate threshold values for each, or a combination of, the operational temperature, a probability of failure, a probability of tire rupture and the like. A threshold value may characterize, for example, a threshold operational temperature, a threshold probability of failure based at least in part on the operational temperature, and/or a threshold probability of tire rupture based at least in part on the operational temperature, and the like.

As noted above, parameter values may be determined in accordance with a statistical analysis of a dataset of parameter values. For example, the parameter values may be aggregated across different criteria, such as different times (e.g., as historical parameter values) by types of parameter value (e.g., operational temperature and/or a probability of failure, such as a probability of tire rupture), different smart wheels, different sensor platforms, different vehicles, and the like. As another example, a parameter value may represent a probability as determined by a statistical model. In some embodiments, by analyzing the aggregated data from various criteria, a threshold value may be determined based on detection of an outlier from the parameter values. In some embodiments, these outliers may determine threshold values, which when met, may define an adverse condition (e.g., an undesirable operational temperature and/or an undesirable probability of failure). These outliers may be determined in accordance with a conventional statistical analysis for outliers. For example, a threshold value may be set as an outlier among various probabilities (e.g., a probability value that is an outlier).

At block 710, a decision may be made as to whether any parameter values meet any associated threshold values. As introduced above, a parameter (e.g. a parameter value) may not necessarily represent a single value, but may also represent a pattern of values and/or a range or spectrum of values, and/or a value that is derived from a predetermined formula that utilizes a predetermined combination of different data values. If yes, the process 700 may proceed to block 712. If no, the process 700 may return to block 702.

At block 712, an action may be performed in response to a parameter value meeting a threshold value. In some embodiments, the action may be taken when a particular parameter value meets a particular threshold value. Accordingly, the action taken may be based on the particular parameter value that is met. The action taken may be, for example, the production of an alert for a driver of a vehicle or other operator of the vehicle, the activation of a particular safety or driving system, a notification of an unsafe driving condition associated with a vehicle in an online database, and the like.

Although various embodiments referred to in connection with FIG. 7 and further below may describe processing of sensor data at a local smart wheel server, in other embodiments the smart wheel sensor system may process sensor data that is sent to a remote smart wheel server via a remote network. As discussed above in connection with FIG. 1, this processing of sensor data may be similar to that only performed locally at the local smart wheel server but be performed by a combination of both the local smart wheel server and the remote smart wheel server.

Figure 8:
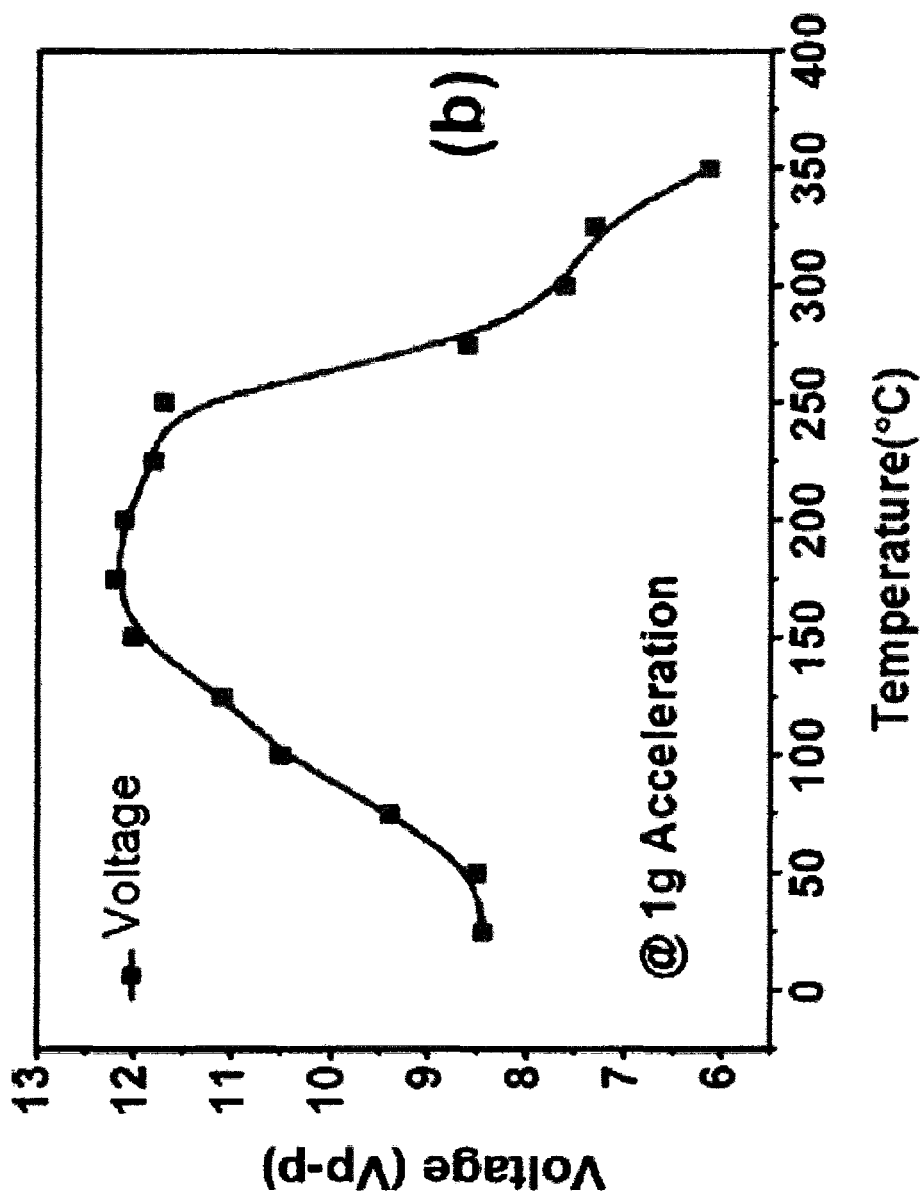
FIG. 8 is a chart of how a temperature may be related to a voltage produced by a piezoelectric transducer, in accordance with various embodiments.

FIG. 8 is a chart of how a temperature may be related to a voltage produced by a piezoelectric transducer 306, in accordance with some embodiments. The X axis may represent temperature values of a tire (e.g., flexible component of a smart wheel) that contacts a piezoelectric transducer. The Y axis may represent voltage values (e.g., normalized voltage values during a period of time of operation) produced by the piezoelectric transducer. As illustrated in FIG. 8, the voltage values may vary between a minimum voltage value and a maximum voltage value. Accordingly, the voltage values may peak at a particular temperature such that there are two possible temperatures for each voltage value. In some embodiments, the chart of FIG. 8 may be consulted to determine a temperature of a tire (e.g., flexible component of a smart wheel) that contacts a piezoelectric transducer (e.g., as based on the voltage value produced by the piezoelectric transducer). In specific embodiments, a determination of tire temperature may be made based on an arbitrary decision to choose a higher or lower of two possible temperature values associated with a voltage value. In particular embodiments, operational temperatures may be continuously tracked based voltage values traversing the curve of FIG. 8 from a known starting temperature and starting voltage value.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A system, comprising: A vehicle body; a rotatable component configured to rotate relative to the vehicle body, wherein the rotatable component comprises a tire and a rim coupled to the tire; a plurality of piezoelectric transducers disposed along a circumference of the rotatable component, wherein each of the plurality of piezoelectric transducers is configured to generate a respective voltage based on a mechanical deformation of a respective piezoelectric transducer, wherein each of the plurality of piezoelectric transducers transforms the mechanical deformation into the respective voltage, wherein each of the plurality of piezoelectric transducers comprises piezoelectric material that is positioned between a bead area of the tire and the rim, wherein the respective voltage is generated as a result of compressive forces resulting from the vehicle body imparting a load on the head area as the vehicle body moves; and at least one processor in communication with each of the plurality of piezoelectric transducers, the at least one processor configured to determine a respective temperature value based on the respective voltages, wherein each of the plurality of piezoelectric transducers is configured to capture a kinetic energy in response to a compressive force acting on the bead area of the tire as the rotatable component rotates, and wherein the at least one processor determines a side wall temperature of the tire based on an average voltage value of the respective voltages generated by the plurality of piezoelectric transducers.

2. The system of claim 1, wherein the temperature value is associated with a flexible sidewall of the tire that contacts the piezoelectric transducer.

3. The system of claim 1, wherein the at least one processor is disposed within a vehicle body to which the rotatable component is mounted.

4. The system of claim 1, wherein the piezoelectric transducer is fixed to the rim and is connected with the voltage sensor via a conductive line.

5. The system of claim 1, further comprising:
a plurality of conductive pins coupled to a respective one of the plurality of piezoelectric transducers; and
a plurality of AC-DC converters,
wherein each of the plurality of conductive pins is configured to extend through a wall of the rotatable component to transfer the respective voltages from the respective ones of the plurality of piezoelectric transducers to respective ones of the plurality of AC-DC converters.

6. A method, comprising: determining a starting temperature; rotating a rotatable component at the starting temperature, wherein the rotatable component is configured to rotate relative to a vehicle body, and wherein the rotatable component comprises a tire an a rim coupled to the tire; determining a respective starting voltage value from a plurality of piezoelectric transducers disposed along a circumference of the rotatable component, wherein each of the plurality of piezoelectric transducers is configured to generate a respective voltage based on a mechanical deformation of the respective piezoelectric transducer, wherein each of the plurality of piezoelectric transducers transforms the mechanical deformation into the respective voltage, wherein each of the plurality of piezoelectric transducers comprises a piezoelectric material that is positioned between a bead area of the tire and the rim, and wherein the respective voltage is generated as a result of compressive forces resulting from the vehicle body imparting a load on the head area as the vehicle body moves; determining respective operational voltage values based on the respective voltages provided by the plurality of piezoelectric transducers; and
determining an operational temperature of a side wall of the tire based on an average value of the respective operational voltage values.

7. The method of claim 6, further comprising:
performing an action based on aggregated sensor data, wherein the aggregated sensor data comprises the operational temperature.

8. The method of claim 6, further comprising:
determining a probability of tire rupture based on the operational temperature.

9. The method of claim 8, further comprising:
producing an alert in response to the probability of tire rupture exceeding a threshold value.

10. The method of claim 9, further comprising:
determining an outlier value as the threshold value using a statistical model applied to sensor data that comprises the operational temperature.

11. The method of claim 6, wherein the piezoelectric transducer comprises a piezoelectric material.

12. The method of claim 6, wherein the rotatable component is mounted to a vehicle body.

13. The method of claim 6, further comprising providing the respective voltages from each of the plurality of piezoelectric transducers via a respective conductive pin that extends through a wall of the rotatable component to respective ones of a plurality of AC-DC converters.

14. A non-transitory computer readable medium having instructions stored thereon, wherein the instructions, when executed by a processor, cause a device to perform operations comprising: receiving a starting temperature associated with a rotatable component, wherein the rotatable component is configured to rotate relative to a vehicle body, and wherein the rotatable component comprises a tire and a rim coupled to the tire; receiving a respective starting voltage value from a plurality of piezoelectric transducers disposed along a circumference of the rotatable component, wherein each of the plurality of piezoelectric transducers is configured to generate a respective voltage based on a mechanical deformation of a respective piezoelectric transducer, wherein each of the plurality of piezoelectric transducers transforms the mechanical deformation into the respective voltage, wherein each of the plurality of piezoelectric transducers comprises a piezoelectric material that is positioned between a bead area of the tire and the rim, and wherein the respective voltage is generated as a result of compressive forces resulting from the vehicle body imparting a load on the bead area as the vehicle body moves; receiving the respective voltages from each of the plurality of piezoelectric transducers; determining a respective operational voltage value based on the respective voltages; and determining an operational temperature based on an average value of the respective operational voltage values, the starting voltage value, and the starting temperature.

15. The non-transitory computer readable medium of claim 14, wherein the operations further comprise:
 determining the operational temperature based on scaling the starting temperature based on the operational voltage value and the starting voltage value.

16. The non-transitory computer readable medium of claim 14, wherein the operations further comprise:
 determining a historical operational temperature set based on the operational temperature collected over a period of time; and
 determining a probability of tire rupture based on the historical operational temperature set.

17. The non-transitory computer readable medium of claim 14, wherein the piezoelectric transducer is configured to send the operational voltage value to the processor via a wireless connection.

18. The non-transitory computer readable medium of claim 17, wherein the wireless connection bypasses a vehicle bus.

* * * * *